United States Patent
Krebs et al.

(10) Patent No.: US 12,496,113 B2
(45) Date of Patent: Dec. 16, 2025

(54) BONE REATTACHMENT SYSTEM

(71) Applicant: Howmedica Osteonics Corp., Mahwah, NJ (US)

(72) Inventors: Viktor Erik Krebs, Rocky River, OH (US); Justin Moidel, Verona, NJ (US); Elizabeth Gonzales, Hoboken, NJ (US)

(73) Assignee: Howmedica Osteonics Corp., Mahwah, NJ (US)

( * ) Notice: Subject to any disclaimer, the term of this patent is extended or adjusted under 35 U.S.C. 154(b) by 281 days.

(21) Appl. No.: 18/115,936

(22) Filed: Mar. 1, 2023

(65) Prior Publication Data
US 2023/0277231 A1 Sep. 7, 2023

Related U.S. Application Data
(60) Provisional application No. 63/315,610, filed on Mar. 2, 2022.

(51) Int. Cl.
*A61B 17/72* (2006.01)
*A61B 17/88* (2006.01)

(52) U.S. Cl.
CPC .......... *A61B 17/8866* (2013.01); *A61B 17/72* (2013.01)

(58) Field of Classification Search
CPC . A61B 17/88; A61B 17/8866; A61B 17/8872; A61B 17/808; A61B 17/74; A61B 17/744; A61B 17/746
See application file for complete search history.

(56) References Cited

U.S. PATENT DOCUMENTS

| | | |
|---|---|---|
| 3,843,975 A | 10/1974 | Tronzo |
| 3,939,498 A | 2/1976 | Lee et al. |
| 4,153,953 A | 5/1979 | Grobbelaar |
| 4,605,416 A | 8/1986 | Grobbelaar |
| 4,698,063 A | 10/1987 | Link et al. |

(Continued)

FOREIGN PATENT DOCUMENTS

| | | |
|---|---|---|
| FR | 2983061 A1 | 5/2013 |
| JP | 2017-104649 A | 6/2017 |

OTHER PUBLICATIONS

Extended European Search Report issued in Appln. No. 23159455.7 dated Jun. 23, 2023 (4 pages).

(Continued)

*Primary Examiner* — Eduardo C Robert
*Assistant Examiner* — Steven J Cotroneo
(74) *Attorney, Agent, or Firm* — Lerner David LLP

(57) ABSTRACT

A bone reattachment system includes an intramedullary implant that includes a longitudinal axis that extends between a first end and a second end thereof, and a stem body that defines at least the second end and is configured to be received within an intramedullary canal of a long bone. The system also includes a clamping assembly for clamping a first bone segment to a second bone segment and includes a mount, a clamp, and an end effector. The mount is connectable to the first end of the intramedullary implant. The clamp has a first end connected to the mount and a second end moveable relative to the first end. The end effector is connected to and extends from the second end of the clamp such that movement of the second end of the clamp relative to the first end moves the end effector in a direction transverse to the longitudinal axis of the intramedullary implant.

16 Claims, 12 Drawing Sheets

(56) References Cited

U.S. PATENT DOCUMENTS

| | | | | |
|---|---|---|---|---|
| 5,356,410 | A | 10/1994 | Pennig | |
| 5,649,930 | A * | 7/1997 | Kertzner | A61B 17/8847 606/80 |
| 5,658,349 | A | 8/1997 | Brooks et al. | |
| 5,702,479 | A | 12/1997 | Schawalder | |
| 6,165,177 | A * | 12/2000 | Wilson | A61F 2/4607 606/100 |
| 6,277,123 | B1 * | 8/2001 | Maroney | A61F 2/4657 606/99 |
| 7,179,259 | B1 | 2/2007 | Gibbs | |
| 7,204,851 | B2 * | 4/2007 | Trieu | A61F 2/4611 623/17.11 |
| 7,476,255 | B2 | 1/2009 | Lester et al. | |
| 7,611,513 | B2 | 11/2009 | Deloge et al. | |
| 7,632,272 | B2 | 12/2009 | Munro et al. | |
| 7,641,698 | B1 | 1/2010 | Gibbs et al. | |
| 8,110,005 | B2 * | 2/2012 | Berelsman | A61F 2/3804 623/20.11 |
| 8,118,868 | B2 | 2/2012 | May et al. | |
| 8,157,808 | B2 * | 4/2012 | Keller | A61F 2/4607 606/89 |
| 8,177,849 | B2 | 5/2012 | Meyers et al. | |
| 8,216,239 | B2 | 7/2012 | Munro et al. | |
| 8,252,061 | B2 | 8/2012 | Mikami et al. | |
| 8,308,806 | B2 | 11/2012 | Grant et al. | |
| 8,460,393 | B2 * | 6/2013 | Smith | A61F 2/3601 623/20.16 |
| 8,529,569 | B2 * | 9/2013 | Smith | A61B 17/56 606/86 R |
| 8,623,093 | B2 | 1/2014 | Dickerson | |
| 8,679,130 | B2 * | 3/2014 | Smith | A61B 17/1753 606/89 |
| 8,734,448 | B2 | 5/2014 | Thakkar | |
| 8,979,940 | B2 | 3/2015 | Porter et al. | |
| 9,005,305 | B2 | 4/2015 | Meyers et al. | |
| 9,050,150 | B2 | 6/2015 | Vargas et al. | |
| 9,138,273 | B2 | 9/2015 | Smith et al. | |
| 9,211,191 | B2 | 12/2015 | Grant et al. | |
| 9,463,054 | B2 | 10/2016 | Mueckter | |
| 9,662,221 | B2 * | 5/2017 | Surma | A61B 17/1739 |
| 10,188,520 | B2 | 1/2019 | Smith et al. | |
| 10,278,749 | B2 | 5/2019 | Jakob et al. | |
| 10,945,850 | B2 * | 3/2021 | Haidukewych | A61B 17/7233 |
| 2004/0122437 | A1 * | 6/2004 | Dwyer | A61F 2/4657 606/87 |
| 2009/0112218 | A1 * | 4/2009 | Mccleary | A61B 17/00 606/151 |
| 2009/0164026 | A1 * | 6/2009 | Mikami | A61F 2/30739 623/23.23 |
| 2011/0218636 | A1 * | 9/2011 | Smith | A61B 17/1753 623/20.35 |
| 2013/0144351 | A1 * | 6/2013 | Johnstone | A61B 17/8866 606/86 R |
| 2013/0261622 | A1 | 10/2013 | Bonjour et al. | |
| 2022/0008206 | A1 | 1/2022 | LaReau | |
| 2023/0389971 | A1 * | 12/2023 | Lionetti | A61B 17/8061 |

OTHER PUBLICATIONS

Stryker Orthopaedics "Dall-Miles Recon and Trauma Cable Systems," Surgical Protocol, Copyright © 2010 Stryker, pp. 1-8.

* cited by examiner

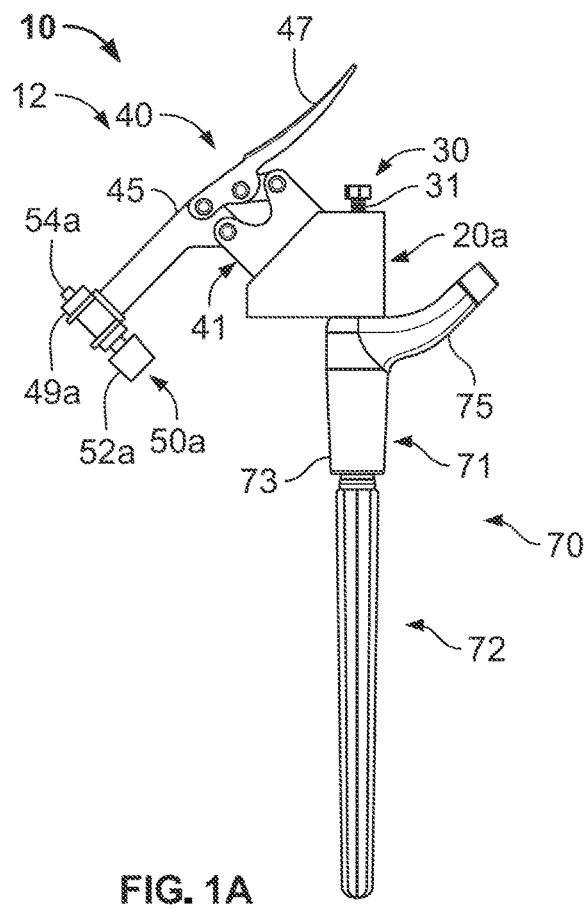
FIG. 1A
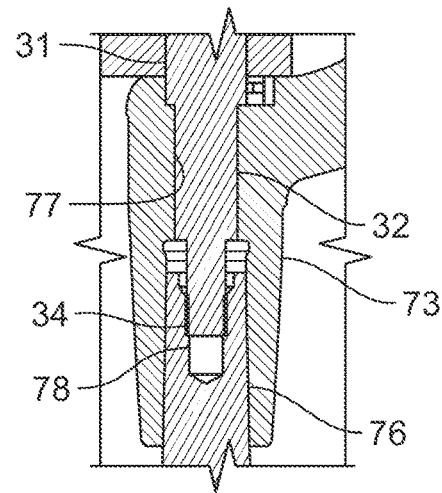
FIG. 1B
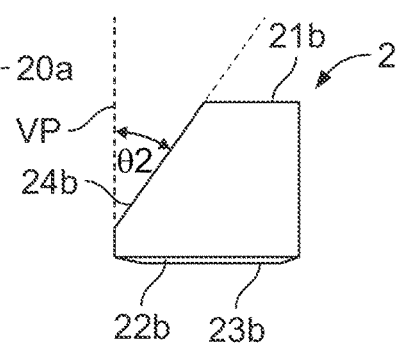
FIG. 2A
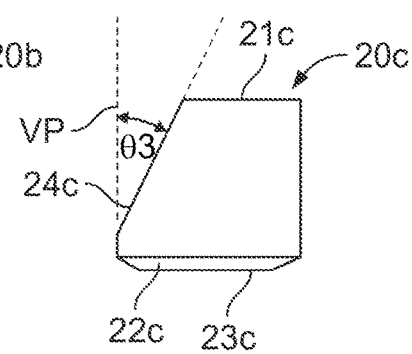
FIG. 2B
FIG. 2C

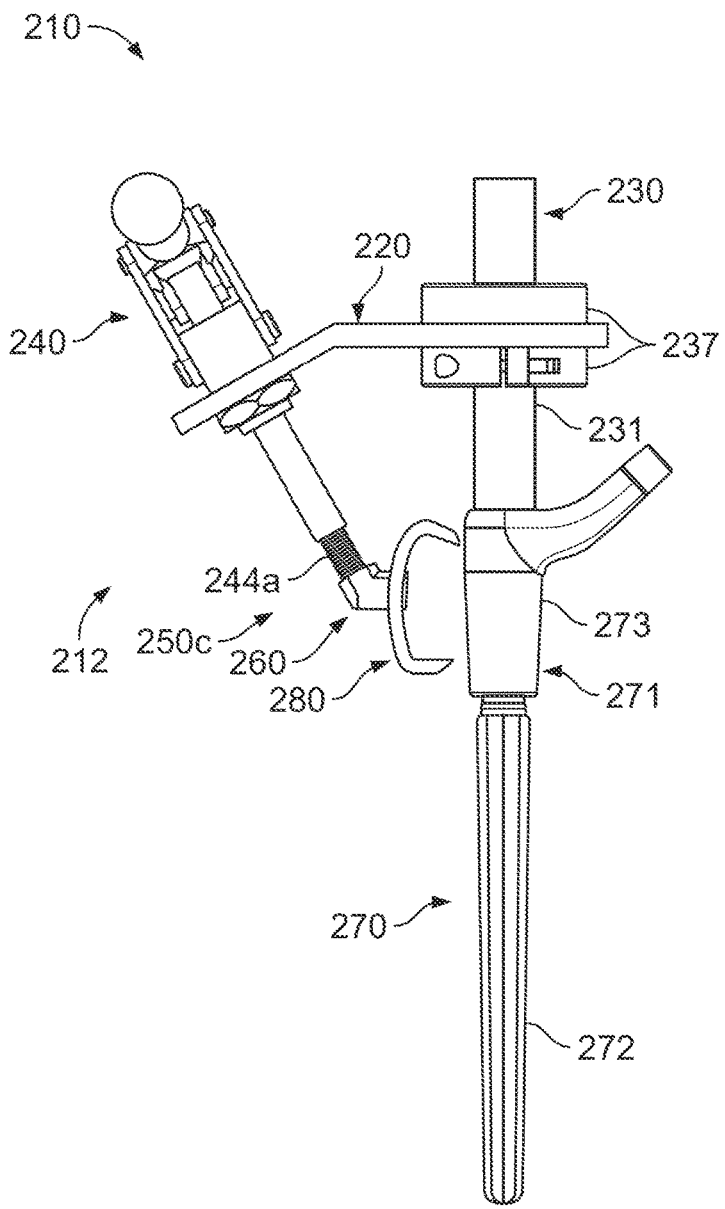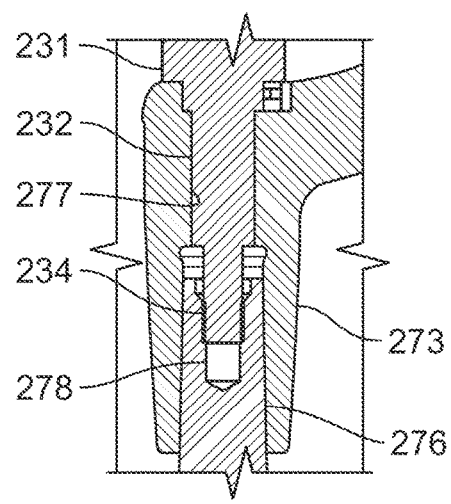
FIG. 10A
FIG. 10B

BONE REATTACHMENT SYSTEM

CROSS-REFERENCE TO RELATED APPLICATIONS

This application claims the benefit of the filing date of U.S. Provisional Application No. 63/315,610, filed Mar. 2, 2022, the disclosure of which is hereby incorporated by reference.

BACKGROUND OF THE INVENTION

Various orthopedic procedures involve reattaching bone that has been segmented into multiple pieces or fragments via a fracture or planned surgical cutting (e.g., osteotomy). This reattachment or reduction can be in addition to the implantation of an orthopedic implant. One such example involves the fixation of a greater trochanter to a remainder of a femur in addition to the implantation of a hip prosthesis or reconstruction nail. In such example, the greater trochanter may have been fractured intraoperatively (e.g., during the introduction of the intramedullary device), postoperatively (e.g., periprosthetic fracture after a previous procedure) or resected as part of the primary or revision procedure. Regardless of the circumstance, the fixation of the greater trochanteric fragment is complicated by the presence of the intramedullary implant whether it be a joint prosthesis or reconstruction nail as the fragment must be properly positioned adjacent to the intramedullary implant and then secured to the bone and/or implant via wires, cables, screws, bolts, and the like. Further complication may be introduced by a bone plate or other extramedullary support that may be utilized to assist in the stabilization and securement of the greater trochanter. Holding the bone fragment and/or bone plate in place has typically been done manually by multiple hands crowded around an operating table or with no assistance to the surgeon. This may be cumbersome particularly where other operations must take place while the fragment and/or bone remain stationary. Therefore, further improvements are desirable.

BRIEF SUMMARY OF THE INVENTION

In one aspect of the present disclosure, a bone reattachment system includes an intramedullary implant that includes a longitudinal axis that extends between a first end and a second end thereof, and a stem body that defines at least the second end and is configured to be received within an intramedullary canal of a long bone. The system also includes a clamping assembly for clamping a first bone segment to a second bone segment and includes a mount, a clamp, and an end effector. The mount is connectable to the first end of the intramedullary implant. The clamp has a first end connected to the mount and a second end moveable relative to the first end. The end effector is connected to and extends from the second end of the clamp such that movement of the second end of the clamp relative to the first end moves the end effector in a direction transverse to the longitudinal axis of the intramedullary implant.

Additionally, the clamp may include a plurality of links between the first and second ends of the clamps. The links may each being connected to at least one of an adjacent link and being moveable relative thereto. The plurality of links may include a first link, a second link, a third link, and a fourth link. The first link may define the first end of the clamp, and the fourth link may define the second end of the clamp. The first and third links may each be connected to the second and fourth links. The third link may include a lever which, when actuated, moves the second end relative to the first end of the clamp. The fourth link may be axially slidable relative to the first link and constrained from rotation. The fourth link may include an elongate slot and a shuttle slidably disposed therein. The end effector may be connected to the shuttle. The links may be configured to move the end effector from a first position to a second position and to self-lock when in the second position to prohibit movement of the end effector.

The mount may include a first surface, a second surface, and an angled surface intersecting at least one of the first and second surfaces and forming an angle therebetween. The clamp may be mounted to the angled surface. The first and second surfaces may be parallel to each other. A bore may extend through the mount from the first surface to the second surface thereof. The system may include a threaded connector configured to extend through the bore of the mount and threadedly engage the first end of the intramedullary implant. An elongate slot may extend through the angled surface of the mount. The clamp may extend through the elongate slot and may be repositionable therein.

Continuing with this aspect, the end effector may include a spike that extends from the end effector for engaging the first bone segment. The end effector may include a bone plate and a plate adapter configured to releasably engage the bone plate. The end effector may include a shaft connected to the clamp. The plate adapter may be disposed at the end of the shaft. The plate adapter may include at least one moveable arm. The moveable arm may be configured to move from a first position to a second position wherein, in the first position, the plate adapter may secure the bone plate, and in the second position, the moveable arm may release the bone plate. The bone plate may include a plurality of claws that extend from a central body thereof.

Also, the intramedullary implant may be a femoral component of a total hip prosthesis, and the first end of the intramedullary implant may include a neck and a first bore that extends along a longitudinal axis of the femoral component, the mount may be connected to the first bore. The intramedullary implant may be a modular femoral component of a total hip prosthesis that includes a neck body and the stem body. The neck body may have a sleeve and the neck may extend from the sleeve, the sleeve may define a first bore extending entirely therethrough and may be configured to receive a portion of stem body therein. The system may also include a threaded connector. The sleeve may have an internal thread extending along and about at least a portion of the first bore. The connector may have an external thread configured to engage the internal thread of the first bore.

The stem body may include a second bore and an internal thread may extend along and about at least a portion of the second bore. The second bore may be coaxially aligned with the first bore when the stem body and neck body are connected together. The external thread of the connector may be configured to engage the internal thread of the stem body. The intramedullary implant may be an intramedullary nail and the stem body may define the first end of the intramedullary implant. The first end may have a threaded bore extending therein. The mount may be connected to the threaded bore of the intramedullary implant via a threaded connector.

In another aspect of the present disclosure, an intramedullary implant includes a first end, a second end, and a stem body that extends along a longitudinal axis of the intramedullary implant and defines at least the second end. The system also includes a clamping assembly that has a first end and a second end. The first end is connected to a first end of the intramedullary implant. The second end is configured to engage a bone segment of a long bone. The clamping assembly is actuatable such that the first end remains stationary relative to the first end of the intramedullary implant while the second end is moved from a first position to a second position. The second end of the clamping assembly is positioned closer to the longitudinal axis of the intramedullary implant when in the second position than in the first position.

In a further aspect of the present disclosure, a method includes implanting an intramedullary implant into an intramedullary canal of a long bone such that that a first end of the intramedullary implant is positioned at an end of the long bone; connecting a clamping assembly to the first end of the intramedullary implant; actuating the clamping assembly so as to move an end effector of the clamping assembly in a direction toward the intramedullary implant; engaging a bone segment of the long bone with the end effector; and holding, via the end effector, the bone segment against at least one of the long bone and the intramedullary implant.

BRIEF DESCRIPTION OF THE DRAWINGS

The features, aspects, and advantages of the present invention will become better understood with regard to the following description, appended claims, and accompanying drawings in which:

FIG. 1A is a front view of a bone reattachment system according to an embodiment of the present disclosure.

FIG. 1B is an enhanced partial cross-sectional view of the reattachment system of FIG. 1A taken along a midline thereof.

FIGS. 2A-2C are front perspective views of one or more mounts of the reattachment system of FIG. 1A.

FIG. 10A is a front view of reattachment system according to another embodiment of the present disclosure.

FIG. 10B is an enhanced cross-sectional view of the reattachment system of FIG. 10B taken along a midline thereof.

DETAILED DESCRIPTION

Figure 3A:
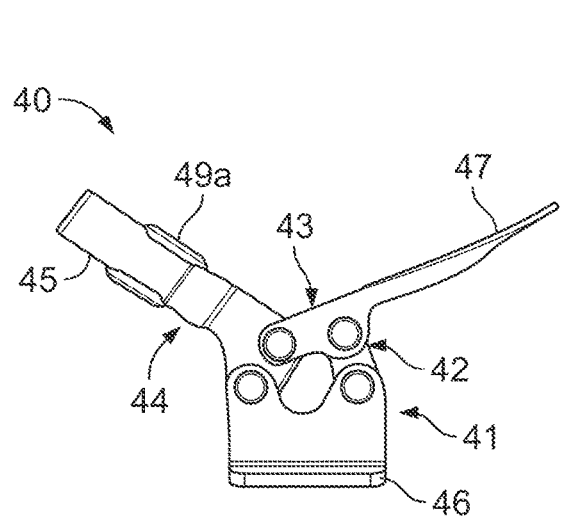
FIG. 3A is a front view of a clamp of the reattachment system of FIG. 1A.

When referring to specific directions in the following discussion of certain implantable devices, it should be understood that such directions are described with regard to the implantable device's orientation and position during exemplary application to the human body. Thus, as used herein, the term "proximal" means close to the heart and the term "distal" means more distant from the heart. Also, as used herein, the terms "about," "generally" and "substantially" are intended to mean that slight deviations from absolute are included within the scope of the term so modified.

FIGS. 1A-5D depict a bone reattachment system 10 according to an embodiment of the present disclosure. System 10 generally includes an intramedullary implant 70 and a clamping assembly 12 connectable to intramedullary implant 70. As explained in more detail below, a first end of clamping assembly 12 connects to a first end of intramedullary implant 70, as shown in FIG. 1A. Clamping assembly 12 is configured to be actuated so that a second end of clamping assembly 12 is moved into a position to hold a first bone segment against a second bone segment and/or intramedullary implant 70. This allows the first bone segment, such as a greater trochanter, to be secured to the second bone segment, such as a femur, in a hands-free manner while more permanent means, such as wires, cables, screws, bolts, and the like can be implemented.

Intramedullary implant 70 is a femoral component of a total hip prosthesis. In the embodiment depicted in FIG. 1A, femoral component 70 is modular and includes a neck body 71 and stem body 72. However, in some embodiments, stem body 72 and neck body 71 may be integrally connected so as to form a monolithic structure. Neck body 71 includes a sleeve 73 and a neck 75 extending from sleeve 73. Neck 75 is configured to be received by a femoral head component (not shown) for articulation with an acetabular component (not shown) of the total hip prosthesis. Sleeve 73 has a generally conically shaped exterior, but can be cylindrically shaped, for example, and has a porous structure defining at least a portion of the exterior for bony ingrowth. A first bore 77 extends through sleeve 73 along a longitudinal axis thereof. An internal thread may extend along and about at least a portion of bore 77, such as a proximal portion thereof. However, in the embodiment depicted, bore 77 may be a smooth-walled bore. First bore 77 is also configured to receive a trunnion 76 of stem body 72. In this regard, a distal portion of bore 77 may be tapered to form a taper-lock connection with trunnion 76, as best shown in FIG. 1B. Trunnion 76 may also include a second bore 78 with an internal thread extending about and along at least a portion of second bore 78. First and second bores 77, 78 coaxially align when neck body 71 is assembled to stem body 72. In the assembled state, neck body 71 defines a proximal end or first end of implant 70, and a distal end of stem body 72 defines a distal end or second end of implant 70.

Clamping assembly generally includes one or more mounts 20a-c, a connector 30, a clamp 40, and one or more end effectors 50a-c. FIG. 2A depicts a first mount 20a which is an angled block that includes a first end surface 21a, second end surface 22a, and an angled or inclined surface 24a extending at least partially between end surfaces 21a, 22a. In the embodiment depicted, end surfaces 21a, 22a are parallel to each other, and a bore 23a extends through mount 20a substantially perpendicular to end surfaces 21a, 22a. Bore 23a may be threaded or smooth-walled (i.e., unthreaded). Angled surface 24a of first mount 20a may intersect one or each of end surfaces 21a, 22a and forms a first angle θ1 relative to a vertical plane VP which is oriented parallel to an axis defined by bore 23a. As shown in FIG. 1A, clamp 40 is mounted to angled surface 24a.

System 10 may include a plurality of angled blocks 20 each with a differently oriented angled surface 24, as further illustrated in FIGS. 2B and 2C. In this regard, a second angled block 20b has an angled surface 24b that defines a second angle θ2, and a third angle block 20c has a third angled surface 24c that defines a third angle θ3. Each of first, second, and third angles θ1-θ3 differ which allows clamp 40 to be differently oriented depending on the mount 20a-c selected in order to provide optimal clamping efficiency. In other words, an optimal clamp angle will ensure that end effector 50a, 50b, or 50c connected to clamp 40 is oriented at the best angle to implement its functionality, as described in more detail below. In the embodiments depicted, θ1 is 45 degrees, θ2 is 35 degrees, and θ3 is 25 degrees. However, in other embodiments, the increments between each angle θ1-θ3 may be smaller or greater than the 10-degree increments of the exemplary embodiment at least partially depending on the number of mounts 20 provided in system 10 which can include more than the three mounts, 20a-c, depicted. Regardless of the increments, angle θ can be 0 to 90 degrees.

Connector 30 is configured to connect any one of mounts 20a-c to the proximal end of intramedullary implant 70. In the embodiment depicted, connector 30 is a threaded fastener that has a shaft 31 with at least a distal end that is threaded to engage bore 78 of trunnion 76. In this regard, shaft 31 may have first and second portions 32, 34 with the first portion 32 having a larger cross-sectional dimension than second portion 34, as best shown in FIG. 1B. Additionally, first portion 32 may have a smooth exterior while second portion 34 may be threaded. Alternatively, where bore 77 is threaded, first portion 32 may be correspondingly threaded. First portion 32 is configured to be received within first bore 77, while second portion 34 is configured to be received in second bore 78. In an alternative embodiment, connector 30 may be integral with mount 20a and may include a quick-connect mechanism, such as a ball-detent, for example, for connecting to the proximal end of intramedullary implant 70.

Figure 3B:
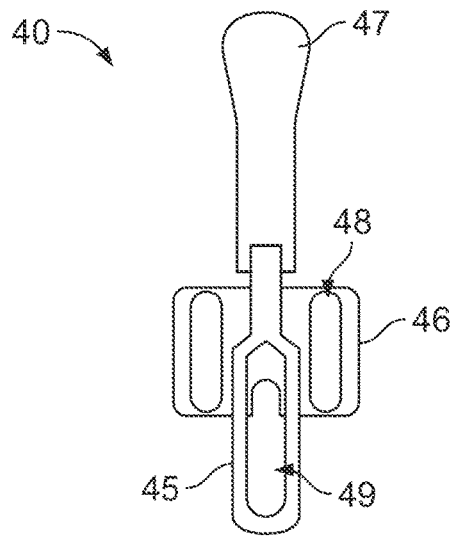
FIG. 3B is a top view of the clamp of FIG. 3A.

As best shown in FIGS. 3A and 3B, clamp 40 is a four-bar linkage toggle clamp. In this regard, clamp 40 includes a first link or member 41, a second link or member 42, a third link or member 43, and a fourth link or member 44. First link 41 defines a first end of clamp 40, while fourth link 44 defines a second end of clamp 40. Links 41-44 are each connected to an adjacent link and moveable relative thereto for a one degree of freedom output at the second end of clamp 40. More specifically, first link 41 acts as a base of clamp 40 which mounts to angled surface 24a of mount 20a via brackets or flanges 46 extending outwardly therefrom. In the embodiment depicted, each bracket 46 defines an elongate slot 48 through which one or more fasteners extend to connect to mount 24a, as best shown in FIG. 3B, which allows for slidable positional adjustments of clamp 40 relative to angled surface 24a. Third link 43 defines a lever 47 for actuation of clamp 40. Fourth link 44 includes an arm 45 which defines the second end of clamp 40. In the embodiment depicted, arm 45 has an elongate slot 49, as shown in FIG. 3B, and a shuttle 49a is slidably disposed within elongate slot 49. Shuttle 49a is configured to connect to any of end effectors 50a-c and, since it is slidable within slot 49, facilitates positional adjustments of an end effector 50a-c for optimal clamping efficiency. First and third links 41, 43 are rotatably connected to second and fourth links 42, 44 so that movement of lever 47 actuates clamp 40 to move arm 45 through a range of motion. Links 41-44 are configured to so that they are self-locking in the second position. In other words, links 41-44 have a mechanical advantage that facilitates the engagement of a toggle-lock at the second position so that arm 45 is locked at a predetermined location until lever is actuated to release the toggle-lock.

FIG. 1A depicts a first end effector or manipulator 50a according to an embodiment of the present disclosure that may be included in system 10. End effector 50a includes a threaded shaft 54a and a compliant stop 52a at an end of threaded shaft 54a. Threaded shaft 54a is configured to be received within shuttle 49a and, at least because it is threaded, the axial position of compliant stop 50a can be adjusted as desired.

Figure 4A:
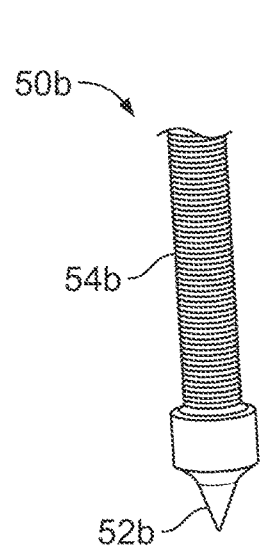
FIG. 4A is a partial perspective view of an end effector of the reattachment system of FIG. 1A according to another embodiment of the present disclosure.
Figure 4B:
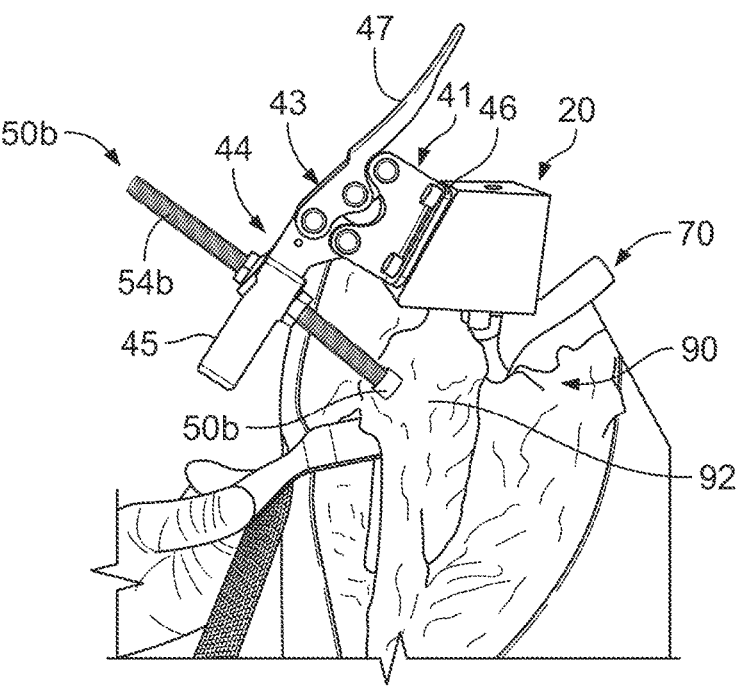
FIG. 4B illustrates the end effector of FIG. 4A as applied to a greater trochanter of a femur.

FIGS. 4A and 4B depict a second end effector or manipulator 50b according to another embodiment of the present disclosure that may be included in system 10. End effector 50b has a threaded shaft 54b and a spike 52b extending from a distal end of threaded shaft 54b. Similar to first end effector 50a, threaded shaft 54b is configured to engage shuttle 49a of clamp 40 to adjust spike 52b in at least two axial degrees of freedom which are perpendicular to each other. As illustrated in FIG. 4B, spike 52b is configured to engage and penetrate a bone segment, such as a greater trochanter 92, to help hold its position against the remainder of a bone, such as femur 90, and/or intramedullary implant 70.

FIGS. 5A-5D depict a third end effector or manipulator 50c (see FIG. 5D) according to a further embodiment of the present disclosure that may be included in system 10. Third end effector 50c includes a threaded shaft 54c, a plate adapter or holder 60, and a bone plate 80. Similar to first end effector 50a, threaded shaft 54c is configured to engage shuttle 49a of clamp 40 to adjust spike 52b in at least two axial degrees of freedom which are perpendicular to each other. However, unlike first and second end effectors 50a-b, third end effector 50c includes extramedullary bone plate 80, which helps permanently secure a bone segment, and plate adapter 60 which releasably connects to bone plate 80.

Figure 5A:
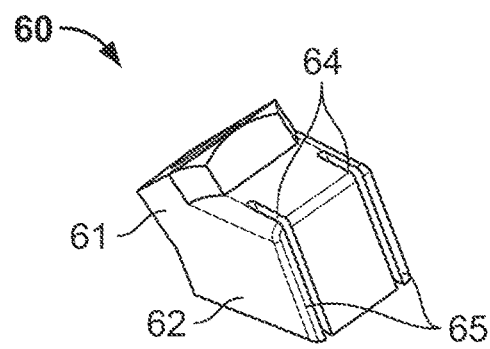
FIG. 5A is a perspective view an end effector of the reattachment system of FIG. 1A according to a further embodiment of the present disclosure.
Figure 5B:
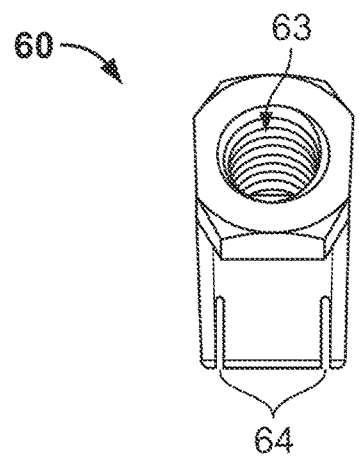
FIG. 5B is a top view of the end effector of FIG. 5A.
Figure 5C:
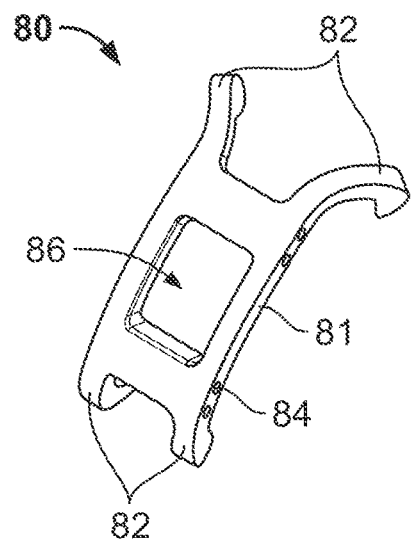
FIG. 5C is a perspective view of a bone plate of the reattachment system of FIG. 1A according to an embodiment of the present disclosure.
Figure 5D:
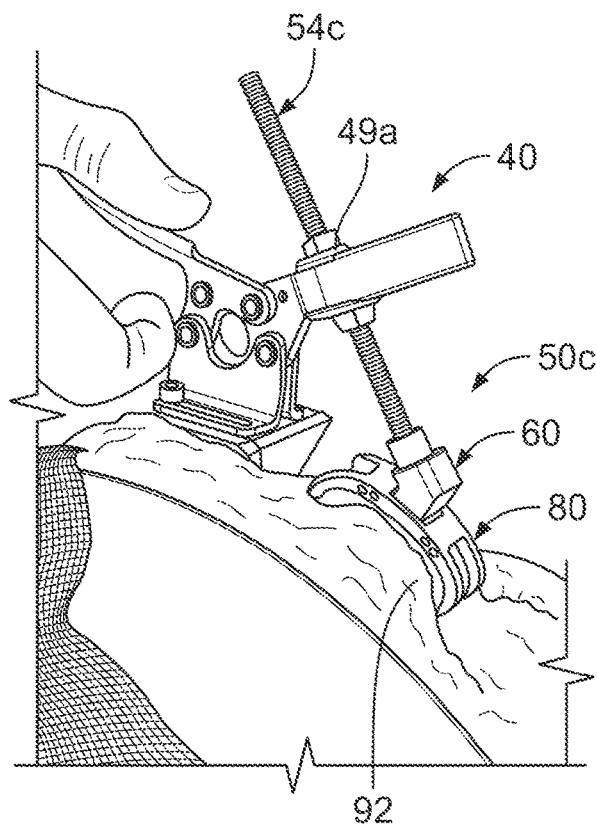
FIG. 5D illustrates the end effector of FIG. 5A as applied to the bone plate of FIG. 5C and a greater trochanter of a femur.

As shown in FIGS. 5A and 5B, plate adapter 60 generally includes a first portion 61 and second portion 62 extending at an oblique angle from first portion 61. A threaded bore 63 extends into first portion 61 for connection to threaded shaft 54c. Second portion 62 includes slots 64 which form cantilevered, moveable arms 65. Bone plate includes a central body 81 and a plurality of claws 82 extending from central body 81. However, in some embodiments, bone plate 80 may not include claws 82. Transverse openings 84 extend through body 81 for receipt of a wire or cable fixators. Other embodiments may additionally or alternatively include bone screw openings for use of a bone screw. A window 86 extends through central body 81. Plate adapter 60 connects to bone plate 80 by pushing second portion of plate adapter 60 into window 86. As this occurs, arms 65 push inwardly so that their bias outwardly pushes on bone plate 80 to secure bone plate 80 to plate adapter 60, as best shown in FIG. 5D. Plate adapter 60 may be released from bone plate 80 by securing bone plate 80 via wires or other fixation devices to the long bone and pulling plate adapter 60 away from bone plate 80 which causes plate adapter 60 to disengage from window 86. It is contemplated that other mechanisms, such as moveable jaws, can be used to secure plate 80 or a different bone plate known in the art. For example, pair of jaws may be moveable relative to each other via a ratchet mechanism that may clamp to the exterior of a bone plate, such as plate 80.

Each of the aforementioned end effectors 50a-c define a second end of clamp assembly 12 while mount 20a-c defines a first end of clamp assembly 12. In this regard, the first end of clamp assembly 12 is mounted or connected to the proximal end of intramedullary implant 70 as defined by neck body 71. Actuation of clamp 40 moves the second end of clamp assembly 12 toward a longitudinal axis of intramedullary implant 70 so that a bone segment disposed therebetween is clamped against the underlying bone and/or intramedullary implant 70, such as the porous surface of sleeve 73.

In addition to that described above and illustrated in the figures, a method of use of system 10 will now be described. It should be understood that the following operations of such method do not have to be performed in the exact order described below. Instead, various steps may be handled in a different order or simultaneously. Steps may also be omitted or added unless otherwise stated therein.

In the method, a greater trochanter 92 has been disassociated from a femur 90 either through injury or deliberate resection. Stem body 72 of intramedullary implant 70 is inserted into an intramedullary canal of femur 90. Clamp assembly 40 is connected to the proximal end of intramedullary implant 70 by placing mount 20a, 20b or 20c onto sleeve 73 and inserting connector 30 through mount 20a-c and into engagement with sleeve 73 and/or trunnion 76 of stem body 72.

Prior to engaging greater trochanter 92 with clamp assembly 12, one of end effector 50a-c is selected for the particular clinical indication. First or second end effector 50a-b may be selected where no bone plate is to be utilized. Conversely, third end effector 50c may be selected where use of bone plate 80 is desirable. However, it should be understood that first or second end effector 50a-b may also be used in conjunction with a bone plate, as explained below. The selected end effector 50a-c is connected to clamp 40 such as by threading respective threaded shaft 54a-c of end effector 50a-c to shuttle 49a. Clamp 40 may be actuated initially without engaging greater trochanter 92 to test the positioning of end effector 50a-c through its range of motion to determine if any adjustments need to be made to ensure optimal clamping efficiency. One such adjustment could include swapping out mount 20a, 20b, or 20c for a different one of mounts 20a-c in order to adjust the angle (θ1-θ3) at which clamp 40 is oriented relative to intramedullary implant 70 by selecting an appropriate angled inclined mount surface 24a-c. Other adjustments may include sliding first link 41 of clamp 40 along the chosen inclined surface 24a-c, sliding the chosen end effector 50a-c within slot 49 of arm 45, and axially advancing shaft 54a-c of the respect end effector 50a-c within shuttle 49a. In addition, connector 30 can be loosened and mount 20a-c can be rotated about a longitudinal axis of connector 30 to achieve a more desirable orientation of clamp 40 relative to greater trochanter 92.

If second end effector 50b is selected, for example, greater trochanter 92 is reduced by hand and placed against femur 90 and/or implant 70. Clamp 40 is then actuated to advance spike 52b from a first position to a second position in which bone segment 92 is engaged by end effector 50b to clamp 40 it against femur 90 and/or implant 70, as shown in FIG. 4B. The self-locking mechanism of clamp 40 is also engaged at the second position so as to hold greater trochanter 92 in a hands-free manner, as also illustrated in FIG. 4B. Greater trochanter bone segment 92 may then be secured to implant 70 and/or bone 90 via a bone screw, wires, cables and the like, for example.

Figure 5E:
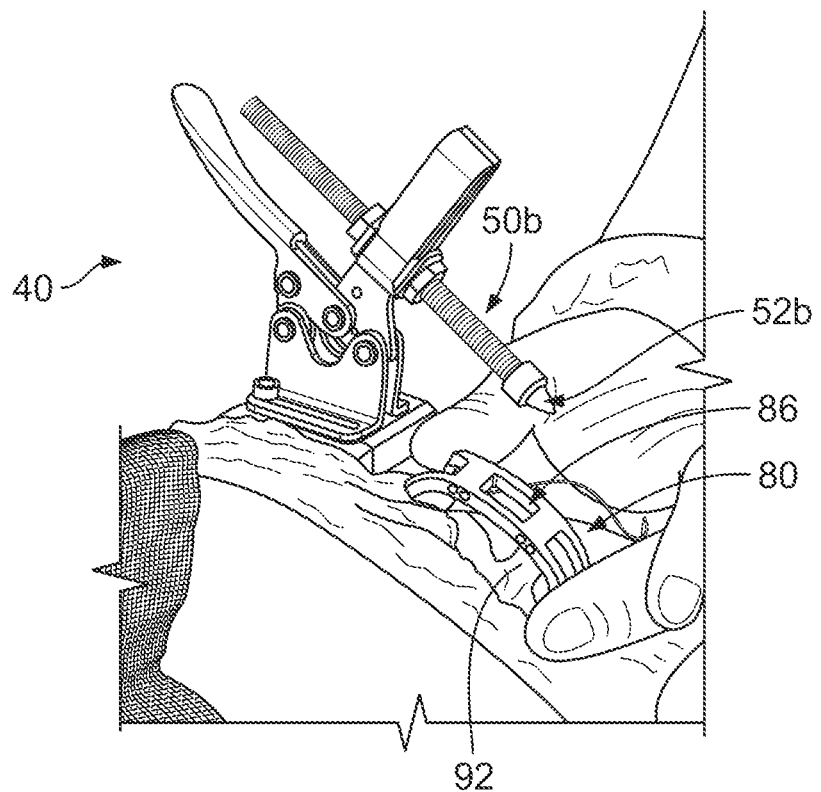
FIG. 5E illustrates the clamp of FIG. 1A with the end effector of FIG. 4A in an open position and the bone plate of FIG. 5C placed against a bone.
Figure 5F:
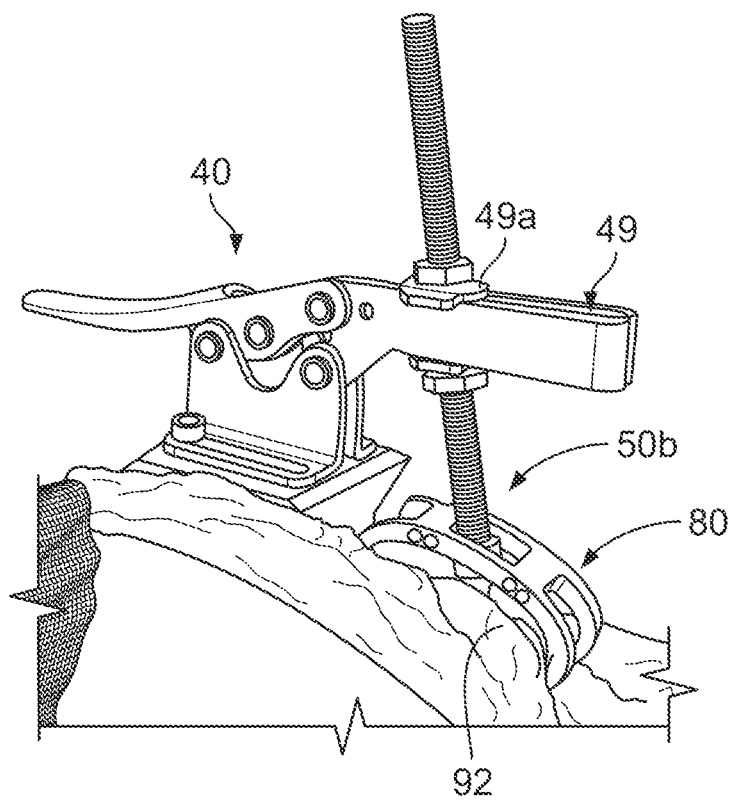
FIG. 5F illustrates the claim of FIG. 1A with the end effector of FIG. 4A in a closed position and as applied to a greater trochanter of a femur and in conjunction with the bone plate of FIG. 5C.

In some embodiments of use, second end effector 50b may be used in conjunction with bone plate 80, as shown in FIGS. 5E and 5F. In this regard, bone plate 80 may be manually placed against a greater trochanter 92 while clamp 40 is in an open position, as illustrated in FIG. 5E. Clamp 40 is then actuated to the closed position such that spiked end effector 50b is engaged to greater trochanter 92 through window 86 of bone plate 80, as illustrated in FIG. 5F, to hold trochanter 92 in place. Fine adjustments can continue to be made to the positioning of bone plate 80 while clamp 40 maintains bone segment 92 in place. Once the desired position of plate 80 is achieved, cables and/or other fixation elements are deployed to secure plate 80 and greater trochanter 92 to the remainder of femur 90. It should be understood that first end effector 50a may be similarly deployed.

If third end effector 50c is selected instead, bone plate 80 is connected to plate adapter 60 by inserting second portion 62 of plate adapter 60 into window 86 of bone plate 80. Greater trochanter segment 92 may either be engaged by bone plate 80 prior to clamping or, as described above, placed by hand against femur 90 in the desired position and then engaged by end effector 50c. In either situation, clamp 40 is actuated to clamp greater trochanter 92 between femur 90 and/or implant 70 and bone plate 80, as best shown in FIG. 5D. While clamp 40 is in the locked position, the surgeon has free hands to secure plate 80 and bone segment 92 using wires and the like. Once secured, lever 47 is actuated to move plate adapter 60 back to the first or unlocked position which disengages plate adapter 60 from bone plate 80. After greater trochanter 92 has been secured, clamping assembly 12 is disconnected from the proximal end of intramedullary implant 70 by removing connector 30 from sleeve 73 and/or stem body 72. Thus, system 10 facilitates the reduction of a bone segment, such as greater trochanter 92, to be achieved by a single user in a hands-free manner.

FIGS. 6-9 depict a bone reattachment system 110 according to another embodiment of the disclosure. For ease of review, like elements will be accorded like reference numerals to that of system 10, but within the 100-series of numbers. For instance, system 110 includes an intramedullary implant 170, which includes stem and neck bodies 171, 172, and a clamp assembly 112. In addition, clamp assembly 112 includes a mount 120, connector 130, clamp 140, and one or more end effectors 150.

Figure 6:
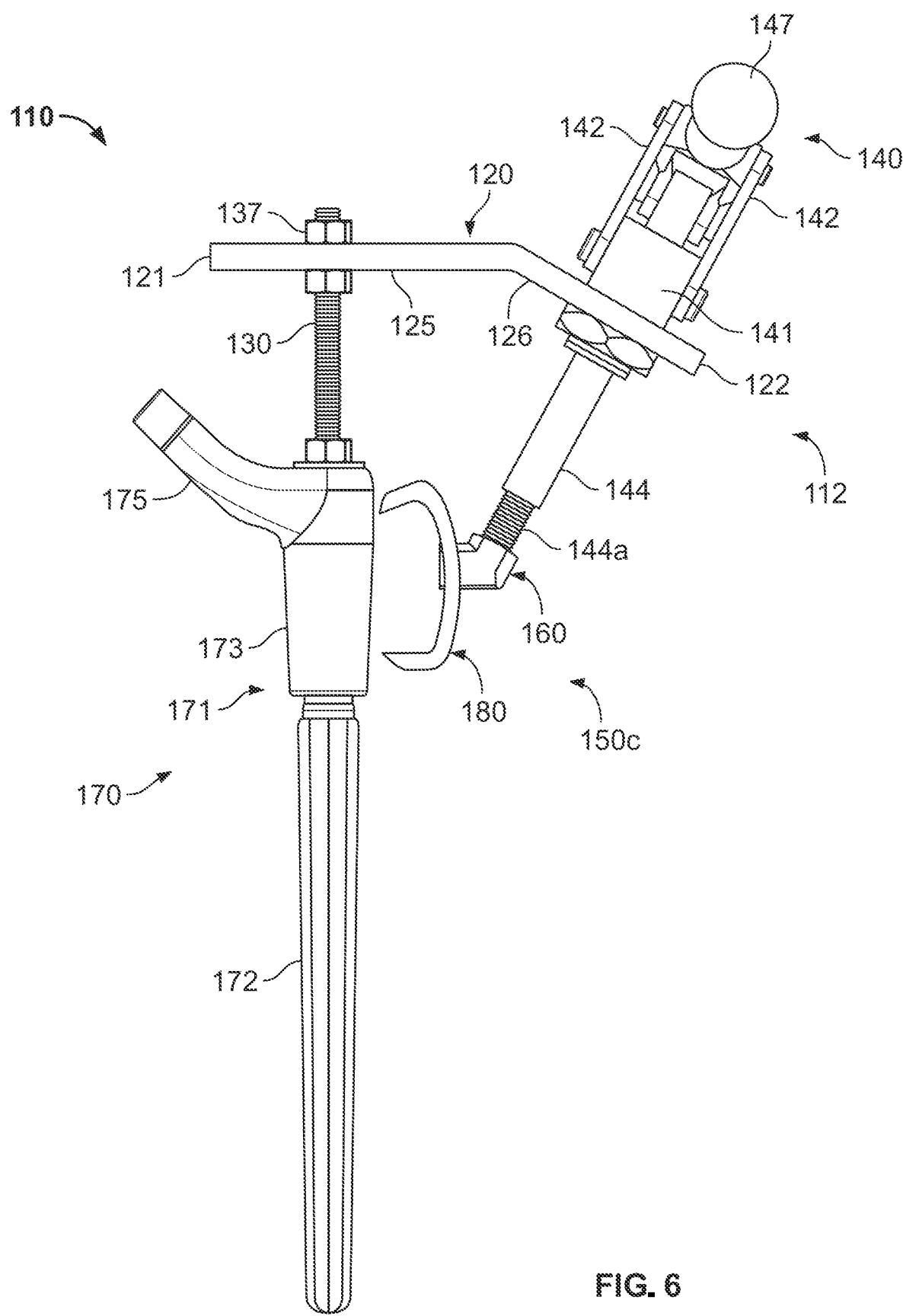
FIG. 6 is a front view of a bone reattachment system according to another embodiment of the present disclosure.
Figure 7:
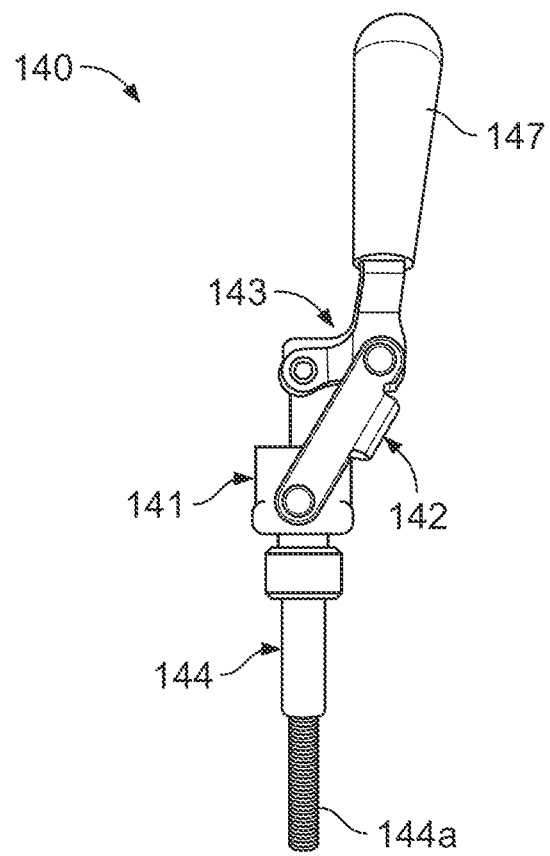
FIG. 7 is a front view of clamp assembly of the reattachment system of FIG. 6.
Figure 8:
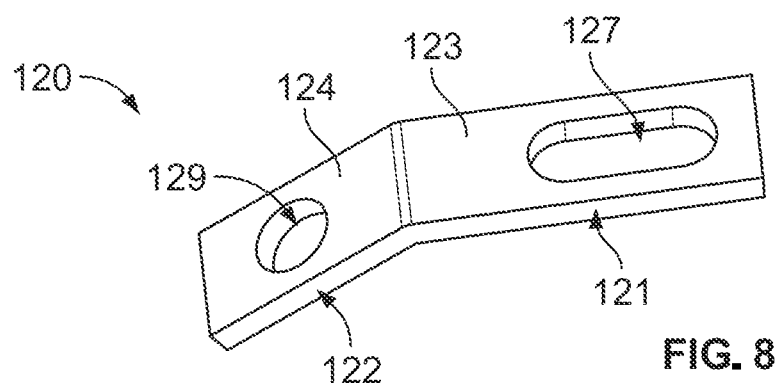
FIG. 8 is a perspective view of a mount of the reattachment system of FIG. 6.

However, system 110 differs from system 210 in a number of ways. First, mount 120 is an angled plate that includes a first portion 121 and a second portion 122 which are obliquely angled relative to each other. As shown in FIGS. 6 and 8, first portion 121 includes a first surface 123 and a second surface 125 substantially parallel to first surface 123. An elongate slot 127 extends through first portion 121, as shown in FIG. 8, for receipt of connector 130 so that mount 120 can be selectively moved relative to connector 130 for positional adjustments of clamp 140 closer to or further from intramedullary implant 170. Second portion 122 includes first and second angled surfaces 124, 126 which are respectively obliquely angled relative to first and second surfaces 123, 125. Similar to mounts 20*a-c* of system 10, system 110 may have additional mounts 120 in which second portion 122 is oriented at different angles to first portion 121. A bore 129 extends through second portion 122, and clamp 140 is mounted to second portion 122 so that clamp 140 extends through bore 129 and is moveable relative thereto upon actuation of clamp 140, as best shown in FIG. 6.

Additionally, connector 130 is a threaded rod which includes a thread extending along and about a majority or all of its length. The configuration of threaded rod 130 in conjunction with angled plate 120 allows angled plate 120 to be rotationally adjusted about a longitudinal axis of threaded rod 130 and translationally adjusted in a proximal-distal direction. Mount 120 can be secured at any location along the length of rod 130 via dual nuts 137, for example, as shown in FIG. 6.

Figure 9:
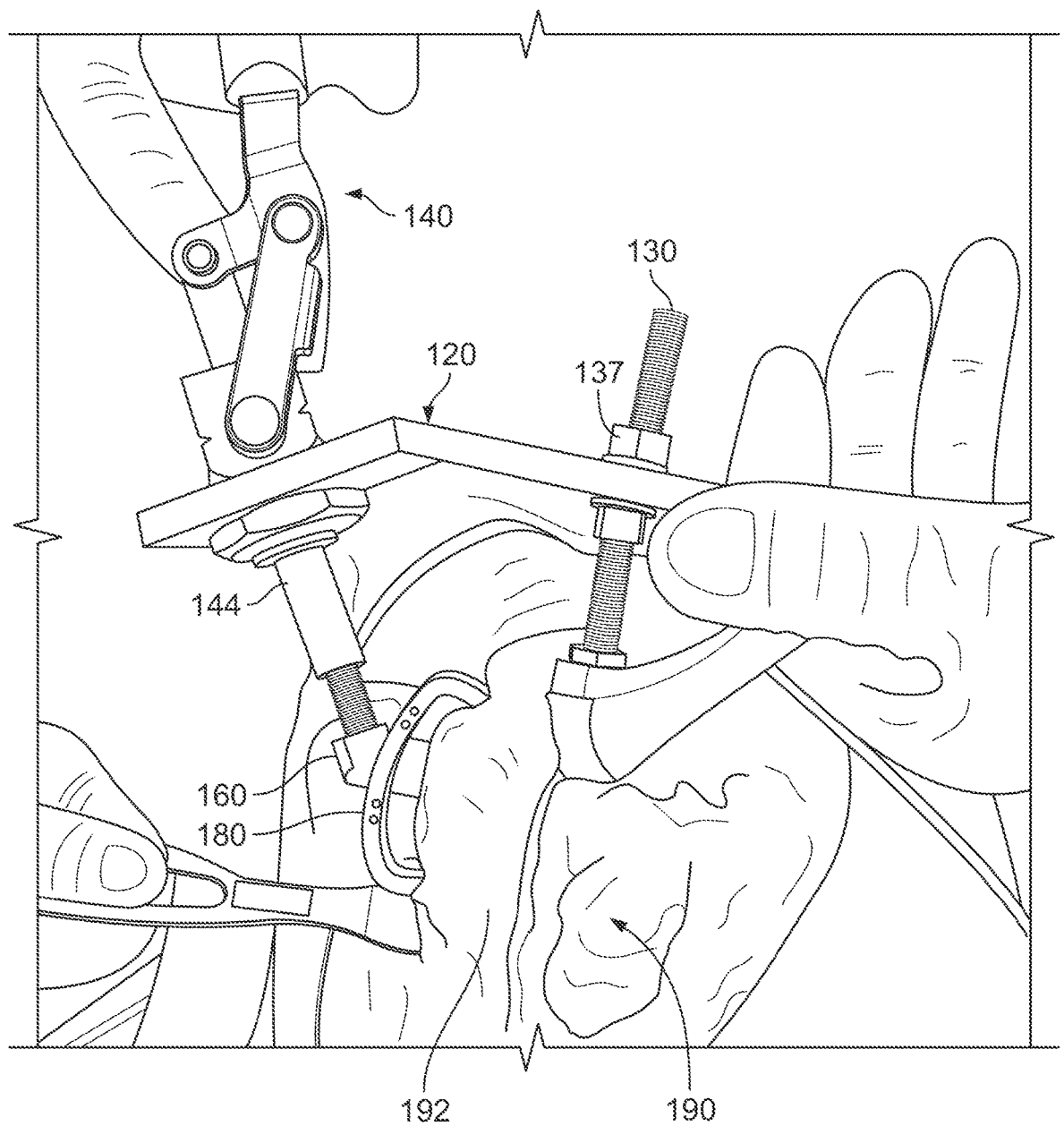
FIG. 9 illustrates the reattachment system of FIG. 6 as applied to a greater trochanter of a femur.

Clamp 140 is similar to clamp 40 in that it is a four-bar linkage toggle clamp. However, it is a push-pull toggle clamp in which a fourth link 144 slides relative to a first link 141 which effectively guides fourth link 144 in an axial direction. Fourth link 144 is also a rod with a threaded member 144*a* that forms a portion of an end effector 150. Threaded member 144*a* is axially adjustable within rod to provide additional adjustability to clamping system 110 and is adapted to modularly connect to compliant stop 52*a* and spike 52*b* via a threaded engagement. Additionally, a bone plate 180 and plate adapter or holder 160, which are identical to plate 80 and adapter 60, can be secured to threaded end 144*a* of fourth member 144, as shown in FIG. 9. Third link 143 is connected to fourth link 144 and second link 142 and has a lever 147 that actuates clamp 140. Upon actuation, fourth link 144 drives whichever end effector 150 is formed thereon in an axial direction toward a greater trochanter 192 to secure it to a femur 190. Adjustments to clamp assembly 112 to ensure the end effector 150 optimally engages bone segment 192 can be made. For example, adjustments can be made to ensure that spiked end effector, like that of 52*b*, when connected to end 144*a*, is oriented generally normal to a surface of greater trochanter 192 so that the spiked end effector penetrates bone 192 and secures it from movement.

FIGS. 10A and 10B depict a bone reattachment system 210 according to another embodiment of the disclosure. System 210 is similar to system 110. Therefore, for ease of review, like elements will be accorded like reference numerals to that of system 110, but within the 200-series of numbers. For instance, system 210 includes an intramedullary implant 270, which includes neck and stem bodies 271, 272, and a clamp assembly 212. In addition, clamp assembly 212 includes a clamp 240, mount or arm 220, and end effectors 250 the same as that of system 110. However, system 210 differs from system 110 in that connector 230 is a rod with a smooth exterior 231 along a majority of its length and a threaded end that is configured to engage sleeve 273 and/or a trunnion 276 of stem body 272, as shown in FIG. 10B. Such connection is similar to that of connector 30 in that the threaded end includes a first portion 232 for engagement to a first bore 277 of sleeve 273, and a second portion 234 for engagement to a second bore 278 of stem body 272. Since rod 230 has a smooth exterior 231 rather than a thread like that of connector 130, ring clamps 237 are utilized to secure mount 220 to rod 230 at any location along length of rod 230 while allowing for selective rotational and axial positional adjustments of mount 220 about and along a longitudinal axis of rod 230.

Figure 11:
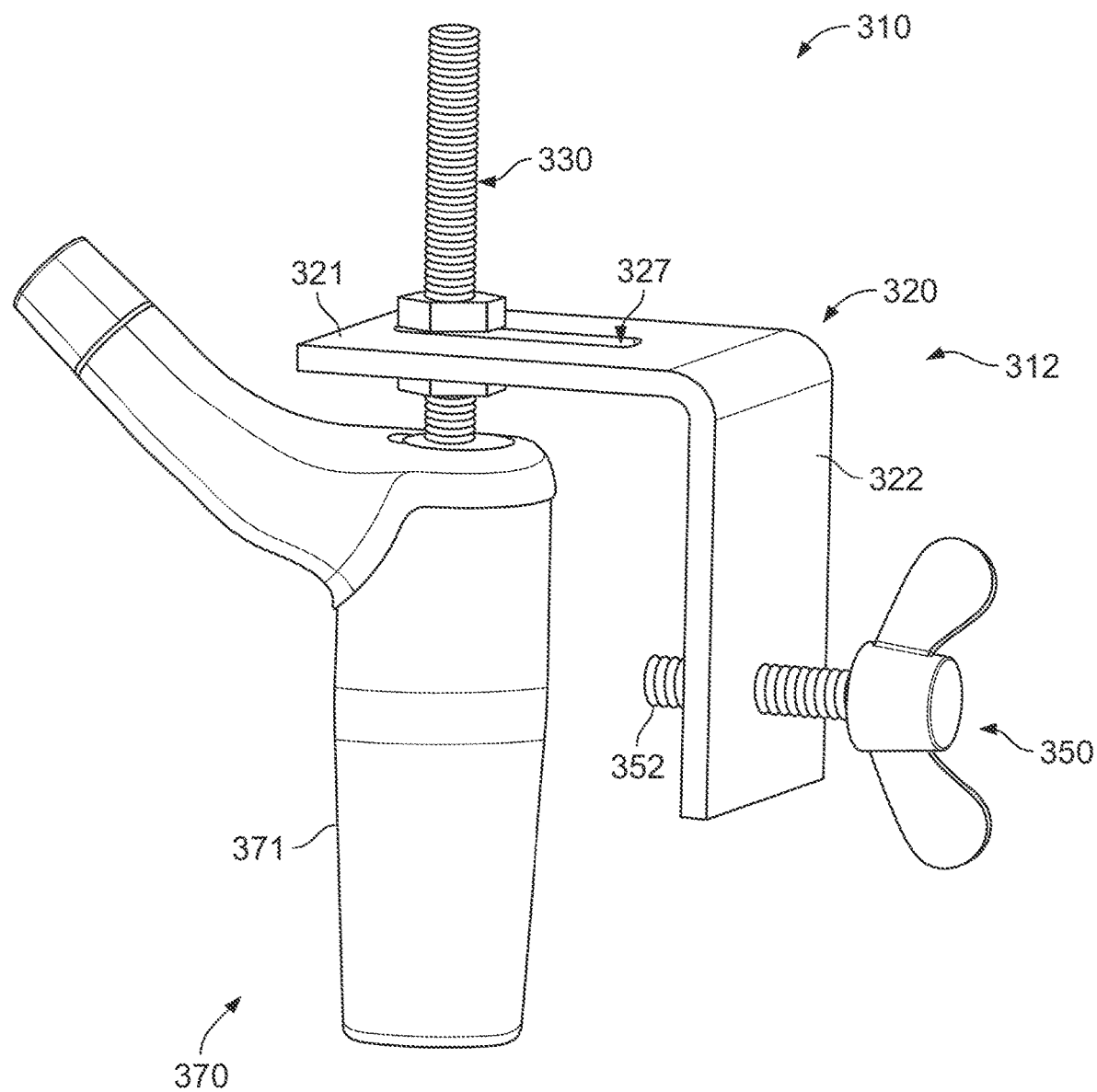
FIG. 11 is a perspective view of a bone reattachment system according to yet another embodiment of the present disclosure.

FIG. 11 depicts a bone reattachment system 310 according to another embodiment of the disclosure. For ease of review, like elements will be accorded like reference numerals to that of system 10, but within the 300-series of numbers. For instance, system 310 includes an intramedullary implant 370 that includes a neck body 371 and stem body, which is just like stem body 72, and a clamp assembly 312. In addition, clamp assembly 312 includes a mount 320, connector 330, and one or more end effectors 350. However, clamp assembly 312 does not include a multi-linkage clamp. Instead, end effector 350 may be a threaded fastener, and more particularly, a wing bolt which is threadedly engaged to mount 320. Any one of compliant plug 52*a* and spike 52*b* can be connected to a threaded shaft 352 of threaded fastener 350 for enhanced engagement with the bone segment. It is also contemplated that a bone plate, such as plate 80, can be connected to threaded fastener 350 via a plate adapter configured specifically for system 310. In this regard, instead of first and second portions being angled relative to each other like portions 61 and 62 of adapter 60, they may be coaligned. Also, mount 320 is an angled plate similar to that of mount 120 in which a first portion 321 is oriented at an angle relative to a second portion 322. In the particular embodiment depicted, the angle of orientation is 90 degrees so that the direction of travel of end effector 350 through second portion 322 is perpendicular to a longitudinal axis of intramedullary implant 370 and toward a bone segment positioned adjacent to intramedullary implant 370.

Figure 12:
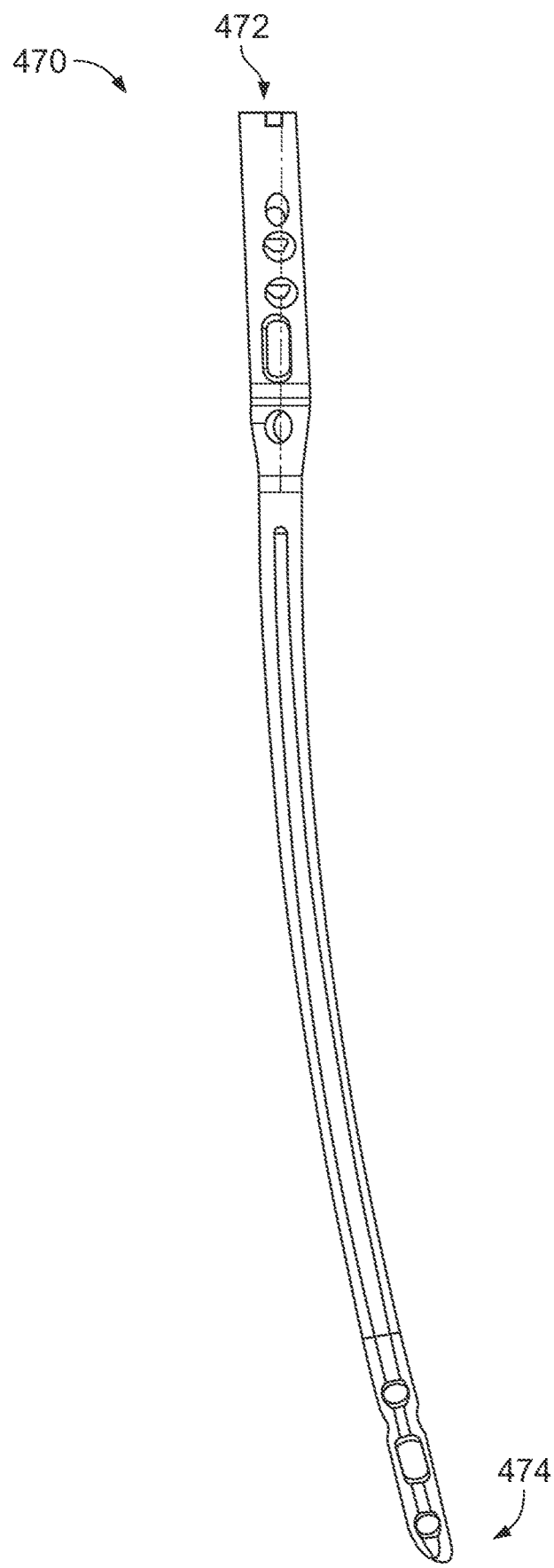
FIG. 12 is a side view of an intramedullary implant according to another embodiment of the disclosure.

FIG. 12 depicts an intramedullary implant 470 according to another embodiment of the present disclosure. In particular, intramedullary implant 470 is a reconstruction intramedullary nail for a femur. Intramedullary nail 470 is a stem body which extends between proximal and distal ends 472, 474 thereof. Any one of the aforementioned clamp assemblies 12, 112, 212, 312 may be connected to proximal end 472 of implant 470 in a manner previously described after its implantation to help secure bone segments to the remainder of the femur where such bone segments may include other segments of a femur other than a greater trochanter.

Figure 13:
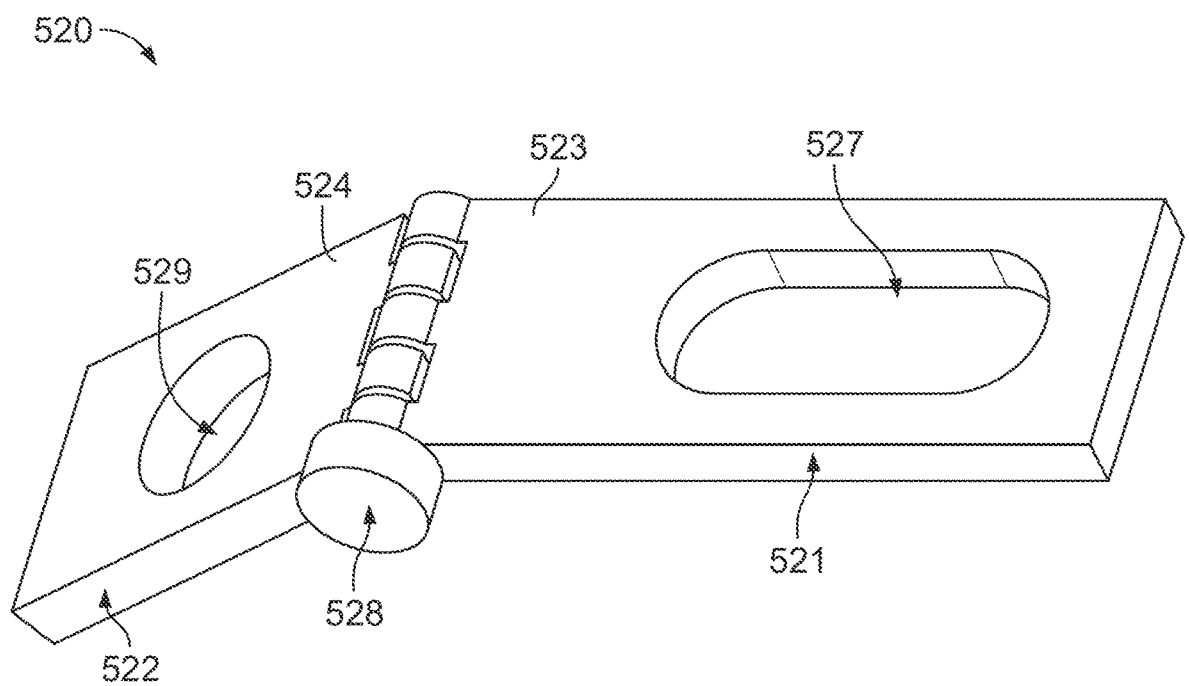
FIG. 13 is a perspective view of a mount according to another embodiment of the present disclosure.

FIG. 13 depicts a mount 520 according to a further embodiment of the present disclosure. For ease of review, like elements will be accorded like reference numerals to that of system mount 120, but within the 500-series of numbers. For instance, mount 520 includes first and second plate portions 521, 522 that are angled relative to each other. Additionally, an elongate slot 527 extends through first portion 521, and a circular opening 529 extends through second portion 522. However, mount 520 differs in that the angle formed between first and second portion 521, 522 is adjustable. In the embodiment depicted, such angle is adjustable by a hinge connection formed by a hinge pin 528 connected to first and second portion 521, 522 which allows second portion 522 to be positioned relative to first portion 521 at any angle between 0 and 90 degrees. In other embodiments, a locking mechanism (not shown) may selectively secure second portion 522 relative to first portion 521 at predetermined angular increments, such as 5-degree increments, for example. Such mechanism can include locking pawls or spring-detents, for example.

Figure 14:
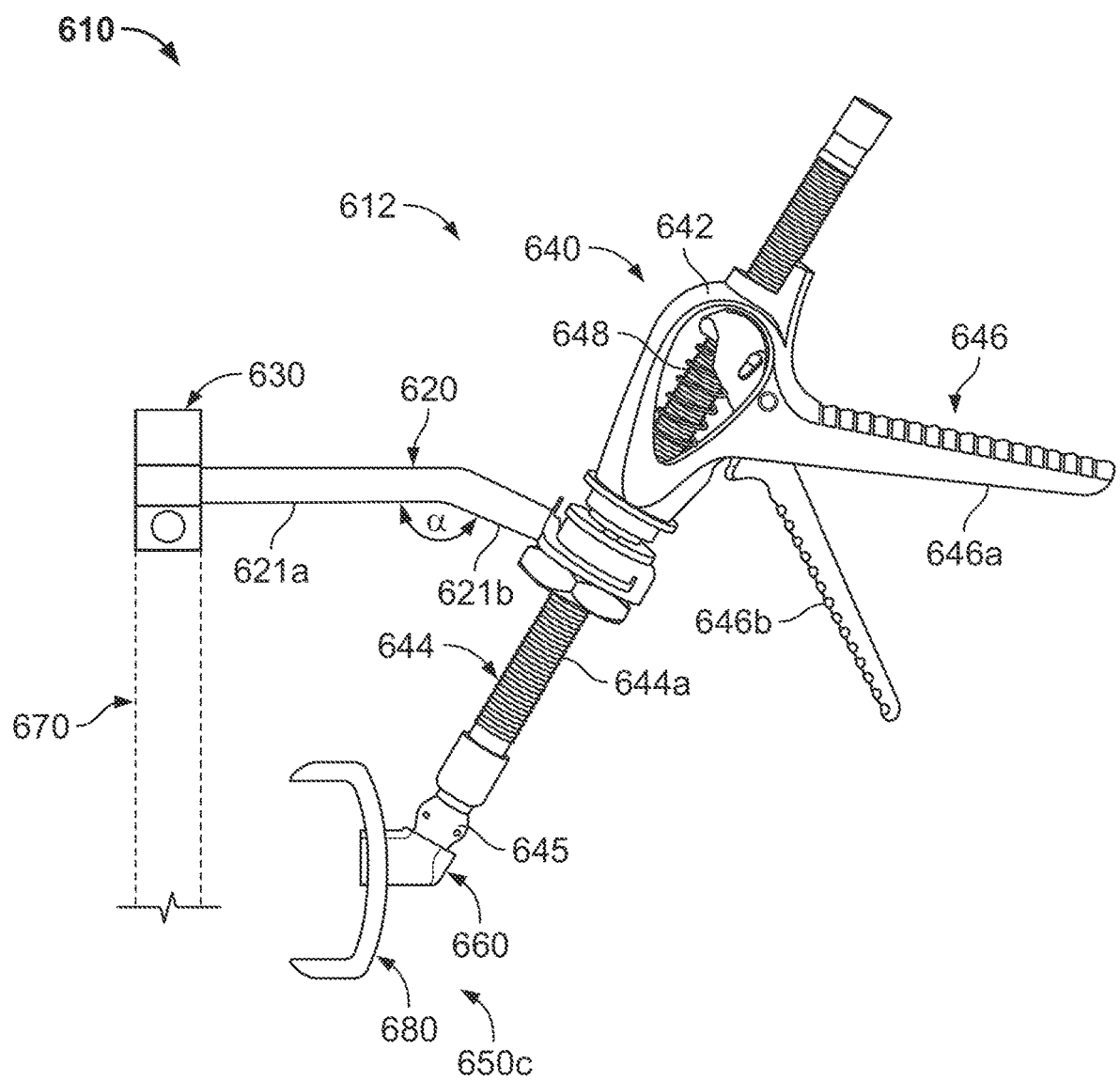
FIG. 14 is a perspective view of a bone reattachment system according to an even further embodiment of the present disclosure.

FIG. 14 depicts a bone reattachment system 610 according to another embodiment of the present disclosure. System 610 is similar to system 110. Therefore, for ease of review, like elements will be accorded like reference numerals to that of system 110, but within the 600-series of numbers. In this regard, system 610 generally includes an intramedullary implant 670 and a clamp assembly 612.

Intramedullary implant 670 can be any one of the intramedullary implants previously discussed. For example, intramedullary implant 670 may be a femoral component of a total hip prosthesis, such as femoral component 70. In another example, intramedullary implant 670 may be an intramedullary nail, such as intramedullary nail 470.

Clamp assembly 612 includes a mount 620, connector 630, clamp 640, and one or more end effectors 650c. Connector 630 is configured to connect to an end of intramedullary implant 670. For example, connector 630 may include a threaded member similar to connector 30 and therefore may be configured to engage a threaded opening in an end of intramedullary implant 670.

Mount or arm 620 is connected to connector 630 at a first end thereof. Mount 620 may be bent along its length or otherwise have a first portion 621a and a second portion 621b that intersect each other at an angle α. Multiple mounts 620 may be provided in a kit each with a different angle α to provide the operator flexibility to engage a bone with end effector 650c from an optimal direction. Alternatively, mount 620 may have a hinge that allows first and second portions 621a-b to be adjusted to an optimal angle.

Clamp 640 is a linear clamp that is connected to a second end of mount 620, as shown. Clamp 640 includes a clamp housing 642 and a compression shaft 644 extending at least partially through clamp housing 642. Compression shaft 644 includes a plurality of concentric rings 644a along its length. A pistol grip 646 extends from housing 642 and includes a first member 626a that integral with housing 642 and a second member 646b that is moveably connected to housing 642 and is operably engaged to compression shaft 644 to form a ratchet mechanism. In this regard, movement of second member 646b from a rest position drives compression shaft 644 in a linear direction a predetermined distance based upon the spacing between each concentric ring 644a. A spring 648 disposed within the housing 642 returns second member 646b to its rest position. Although the ratchet mechanism depicted herein includes a compression shaft 644 with concentric rings 644a, other types of ratchet mechanisms may be utilized, such as one in which shaft 644 includes teeth (not shown). Further, other linear mechanisms can be utilized to drive end effector 650c, such as a rack and pinion mechanism, power screw, or electromechanical linear actuator, for example.

End effector 650c may include any of the end effectors previously disclosed herein, such as end effectors 50a and 50b. As shown in FIG. 14, end effector 650c is connected to a driven end 645 of compression shaft 644 and includes a bone plate 680 and an adapter 660, which are like that of bone plate 80 and adaptor 60 of end effector 50c. Adaptor 660 is connected to driven end 645 of compression shaft 644 either in a fixed relationship relative thereto or in a pivotable relationship. For example, adaptor 660 and driven end 645 may form a spherical joint for pivotable movement about three axes. In other embodiments, a joint formed between adaptor 660 and driven end 645 may be constrained about one or more axes so that adaptor 660 is pivotable about one or two axes, rather than three. In any event, such pivotable movement may allow bone plate 680 to evenly engage with a bone along all points and areas thereof when driven into contact with the bone via clamp 640.

Although the exemplary embodiments described herein have been described in the context of reattachment of a greater trochanter to a proximal femur, it should be understood that the devices and systems described herein can be utilized to reattached bone to other long bones, such as the humerus, tibia and distal femur, for example.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A bone reattachment system, comprising:
an intramedullary implant having a longitudinal axis extending between a first end and a second end thereof, and a stem body defining at least the second end and being configured to be received within an intramedullary canal of a long bone; and
a clamping assembly for clamping a first bone segment to a second bone segment having a mount, a clamp, and an end effector, the mount being connectable to the first end of the intramedullary implant, the clamp having a first end connected to the mount and a second end moveable relative to the first end, the end effector connected to and extending from the second end of the clamp such that movement of the second end of the clamp relative to the first end moves the end effector in a direction transverse to the longitudinal axis of the intramedullary implant,
wherein the clamp includes a plurality of links between the first and second ends of the clamps, the links each being connected to at least one of an adjacent link and being moveable relative thereto,
wherein the plurality of links includes a first link, a second link, a third link, and a fourth link, the first link defining the first end of the clamp, the fourth link defining the second end of the clamp, wherein the first and third links each being rotatably connected to the second and fourth links, wherein the third link includes a lever which, when actuated, moves the second end relative to the first end of the clamp.

2. The system of claim 1, wherein the fourth link is axially slidable relative to the first link and constrained from rotation.

3. The system of claim 1, wherein the fourth link includes an elongate slot and a shuttle slidably disposed therein, the end effector connected to the shuttle.

4. The system of claim 1, wherein the links are configured to move the end effector from a first position to a second position and to self-lock when in the second position to prohibit movement of the end effector.

5. The system of claim 1, wherein the mount includes a first surface, a second surface, and an angled surface intersecting at least one of the first and second surfaces and forming an angle therebetween, the clamp being mounted to the angled surface.

6. The system of claim 5, wherein the first and second surfaces are parallel to each other.

7. The system of claim 5, wherein a bore extends through the mount from the first surface to the second surface thereof.

8. The system of claim 5, further comprising a threaded connector configured to extend through the bore of the mount and threadedly engage the first end of the intramedullary implant.

9. The system of claim 5, wherein an elongate slot extends through the angled surface of the mount, the clamp extending through the elongate slot and being repositionable therein.

10. The system of claim 1, wherein the end effector includes a spike extending therefrom for engaging the first bone segment.

11. The system of claim 1, wherein the end effector includes a bone plate and a plate adapter configured to releasably engage the bone plate.

12. The system of claim 11, wherein the end effector includes a shaft connected to the clamp, the plate adapter disposed at the end of the shaft.

13. The system of claim 11, wherein the plate adapter includes at least one moveable arm, the moveable arm configured to move from a first position to a second position wherein, in the first position, the plate adapter secures the bone plate, and in the second position, the moveable arm releases the bone plate.

14. The system of claim 1, wherein clamping assembly includes a ratchet mechanism configured to incrementally advance the end effector.

15. The system of claim 1, wherein the intramedullary implant is a femoral component of a total hip prosthesis, and the first end of the intramedullary implant includes a neck and a first bore extending along a longitudinal axis of the femoral component, the mount connected to the first bore.

16. A bone reattachment system, comprising:

an intramedullary implant having a first end, a second end, and a stem body extending along a longitudinal axis of the intramedullary implant and defining at least the second end; and a clamping assembly having a first end and a second end, the first end being connected to a first end of the intramedullary implant, the second end configured to engage a bone segment of a long bone, the clamping assembly being actuatable such that the first end remains stationary relative to the first end of the intramedullary implant while the second end is moved from a first position to a second position, the second end of the clamping assembly being positioned closer to the longitudinal axis of the intramedullary implant when in the second position than in the first position, wherein the clamping assembly includes a plurality of links between the first and second ends, the links each being connected to at least one of an adjacent link and being moveable relative thereto, wherein the plurality of links includes a first link, a second link, a third link, and a fourth link, the first link defining the first end of the clamping assembly, the fourth link defining the second end of the clamping assembly, wherein the first and third links each being rotatably connected to the second and fourth links, wherein the third link includes a lever which, when actuated, moves the second end to the second position.

* * * * *